United States Patent
Enomoto et al.

(10) Patent No.: US 6,953,815 B2
(45) Date of Patent: Oct. 11, 2005

(54) PROCESS FOR PRODUCTION OF INORGANIC FILLER-CONTAINING POLYOLEFIN RESIN COMPOSITION

(75) Inventors: Takehiko Enomoto, Hoover, AL (US); Tamio Serita, 2-34, Asami 3-chome, Beppu-shi, Oita-ken (JP)

(73) Assignee: Tamio Serita, Beppu (JP)

( * ) Notice: Subject to any disclaimer, the term of this patent is extended or adjusted under 35 U.S.C. 154(b) by 348 days.

(21) Appl. No.: 10/115,033

(22) Filed: Apr. 4, 2002

(65) Prior Publication Data

US 2003/0045622 A1 Mar. 6, 2003

(30) Foreign Application Priority Data

Apr. 4, 2001 (JP) ........................................ 2001-105641

(51) Int. Cl.[7] .............................. C08J 3/20; C08J 3/22; C08K 3/26; C08K 3/34
(52) U.S. Cl. .................... 523/348; 523/351; 526/130; 524/425; 524/442; 524/451
(58) Field of Search ................ 523/351, 348; 526/130; 524/425, 442, 451

(56) References Cited

U.S. PATENT DOCUMENTS

| | | | |
|---|---|---|---|
| 4,187,210 A | * 2/1980 | Howard, Jr. | ................ 524/730 |
| 4,252,914 A | 2/1981 | Halasa et al. | |
| 5,412,025 A | * 5/1995 | Fries | ........................... 524/765 |
| 5,422,386 A | * 6/1995 | Fries et al. | ................. 523/344 |
| 5,438,090 A | * 8/1995 | Matsubara et al. | ......... 524/490 |
| 5,807,976 A | * 9/1998 | McHaney | ................... 528/481 |
| 5,856,400 A | 1/1999 | Matsumura et al. | |
| 6,107,388 A | 8/2000 | Sanpei et al. | |
| 6,703,439 B2 | * 3/2004 | Yano et al. | ................ 524/515 |

FOREIGN PATENT DOCUMENTS

| | | |
|---|---|---|
| EP | 0 225 693 | 6/1987 |
| EP | 0 700 943 | 3/1996 |
| EP | 0 739 941 | 10/1996 |
| GB | 2 309 973 | 8/1997 |
| JP | 9-77953 | 3/1997 |
| JP | 02000143996 A | * 5/2000 |
| WO | 8-41278 | 2/1996 |
| WO | 8-41279 | 2/1996 |
| WO | 8-67783 | 3/1996 |
| WO | 8-1-4792 | 4/1996 |
| WO | WO 98/54257 | 12/1998 |
| WO | WO 98/54258 | 12/1998 |

OTHER PUBLICATIONS

Testing Methods for Polyvinyliden Chloride, Japanese Industrial Standard, JIS K 6722:1995.
Testing Methods for Polypropylenes, Japanese Industrial Standard, JIS K 6758—1981.

* cited by examiner

Primary Examiner—Tae H. Yoon
(74) Attorney, Agent, or Firm—Leydig, Voit & Mayer Ltd.

(57) ABSTRACT

The present invention provides a highly economical process for production of an inorganic filler-containing polyolefin resin composition, and a production apparatus to be used for the process, whose process is characterized by carrying out a continuous series of steps from an olefin polymerization step up to a kneading/pelletizing step wherein the polyolefin resin obtained by the polymerization step is kneaded and pelletized with an inorganic filler and various additives.

4 Claims, No Drawings

PROCESS FOR PRODUCTION OF INORGANIC FILLER-CONTAINING POLYOLEFIN RESIN COMPOSITION

FIELD OF THE INVENTION

The present invention relates to a process and apparatus for production of an inorganic filler-containing polyolefin resin composition. More specifically, it relates to a highly economical process and apparatus which allow production of an inorganic filler-containing polyolefin resin composition with excellent physical properties.

BACKGROUND OF THE INVENTION

Conventional production of inorganic filler-containing polyolefin resin compositions has been accomplished by the following procedure.

(1) The polyolefin resin obtained by polymerization is stocked as a powder, or small amounts of additives such as antioxidants are combined therewith before kneading and pelletization to make pellets, which are packed into paper bags and stocked in a storage facility.

(2) For production of the inorganic filler-containing polyolefin resin composition, the stocked polyolefin resin powder or pellets are transported to a compounding facility or compounding factory.

(3) The powdered or pelletized polyolefin resin, the inorganic filler and the various additives are separately supplied to a pellitizer for kneading and pelletizing, or else are simultaneously mixed in a high-speed mixer or the like and then kneaded and pelletized with a pellitizer.

This procedure, however, requires a storage facility such as a warehouse and a special pelletizing apparatus, which leads to increased production costs including transport of the intermediate materials. In addition, it is often difficult to obtain stable product quality.

It is an object of the present invention to solve the aforementioned problems relating to production of inorganic filler-containing polyolefin resin compositions, and specifically to provide a highly economical process and apparatus which allow production of an inorganic filler-containing polyolefin resin composition with excellent physical properties.

SUMMARY OF THE INVENTION

As a result of much diligent research directed toward solving the aforementioned problems, the present inventors have completed the present invention upon finding that by carrying out a continuous series of steps from an olefin polymerization step up to a kneading/pelletizing step in which the polyolefin resin obtained by the polymerization step is kneaded and pelletized with an inorganic filler and various additives, it is possible to simplify the intermediate storage facilities such as warehouses and the conveyance equipment and reduce stocking costs, transport costs and the like, in order to achieve the intended object. Specifically, the present invention has the following construction.

(1) A process for production of an inorganic filler-containing polyolefin resin composition, in which the process carries out a continuous series of steps from an olefin polymerization step up to a kneading/pelletizing step where the polyolefin resin obtained by the polymerization step is kneaded and pelletized with an inorganic filler and various additives.

(2) A process for production of an inorganic filler-containing polyolefin resin composition according to (1) above, in which the inorganic filler is a powder compressed by degassing, wherein the compression ratio (the bulk density ratio as measured according to JIS K6722; the value of the bulk density of the compressed inorganic filler when supplied to the kneading/pelletizing apparatus divided by the bulk density of the inorganic filler before compression) is 1.1–3.0.

(3) A process for production of an inorganic filler-containing polyolefin resin composition according to (2) above, wherein the inorganic filler is calcium carbonate, talc or wollastonite.

(4) A process for production of an inorganic filler-containing polyolefin resin composition according to any one of (1) to (3) above, wherein the polyolefin resin, the inorganic filler and the various additives are premixed between the polymerization step and the kneading/pelletizing step.

(5) A process for production of an inorganic filler-containing polyolefin resin composition according to any one of (1) to (4) above, wherein the kneading/pelletizing step is carried out using a tandem-type kneading/pelletizing apparatus which separately accomplishes the kneading step and the pelletizing step.

(6) An apparatus for production of an inorganic filler-containing polyolefin resin composition, in which the apparatus comprises, in a continuous series, an olefin polymerization apparatus and a kneading/pelletizing apparatus where the polyolefin resin obtained from the polymerization apparatus is kneaded and pelletized with an inorganic filler and various additives.

(7) An apparatus for production of an inorganic filler-containing polyolefin resin composition, in which the apparatus comprises, in a continuous series, an olefin polymerization apparatus, a premixing apparatus where an inorganic filler and various additives are added to the polyolefin resin obtained from the polymerization apparatus, and a tandem-type kneading/pelletizing apparatus where the mixture obtained from the premixing apparatus is kneaded and pelletized.

DETAILED DESCRIPTION OF THE INVENTION

Embodiments of the present invention will now be explained in detail.

The process for production of an inorganic filler-containing polyolefin resin composition according to the invention is characterized by carrying out a continuous series of steps including all the steps from an olefin polymerization step up to a kneading/pelletizing step where an inorganic filler is kneaded and pelletized with the polyolefin resin obtained by the polymerization step.

The apparatus for production of an inorganic filler-containing polyolefin resin composition according to the invention is characterized in that all of the apparatuses used, from the olefin polymerization apparatus to the kneading/pelletizing apparatus where the inorganic filler is kneaded and pelletized with the polyolefin resin obtained from the polymerization apparatus, are connected by a transport mechanism such as a transport pipeline.

(Continuous Series of Steps)

"Continuous series of steps" according to the present invention means that the series of steps from the polymerization step to the kneading/pelletizing step is carried out in a connected fashion, and according to the process for production of an inorganic filler-containing polyolefin resin composition of the invention, the polymerized polyolefin resin is produced as a pelletized inorganic filler-containing polyolefin resin composition without exiting the process line. Thus, the inorganic filler-containing polyolefin resin produced by the production process of the invention contains virtually no contaminants from outside the production apparatus. Moreover, since the process is carried out in a continuous manner from the polymerization step to the kneader, there is no exposure to the outside air and, for example, it may be transported in an nitrogen atmosphere and subjected to melt kneading so that oxidative breakdown by air is avoided.

According to the invention, the polyolefin resin produced by the polymerization step is transported through a transport pipeline to the kneading/pelletizing apparatus. Depending on the need, a storage apparatus may be provided for the polyolefin resin between the polymerization apparatus and the pelletizing apparatus, for temporary storage of the polyolefin resin. Temporary storage of the polyolefin resin offers the following advantages.

a) It is possible to prevent halting of the olefin polymerization step when production of the inorganic filler-containing resin composition is temporarily suspended due to trouble with the kneading/pelletizing apparatus.

b) There is no need to reduce the olefin polymerization rate when the amount of polyolefin resin used for production of the inorganic filler-containing resin composition falls behind the polymerization rate of the olefin.

(Storage and Transport of Inorganic Filler, Elastomer)

A special storage apparatus may be provided for storage of the inorganic filler and additives such as antioxidants, photostabilizers, ultraviolet absorbers, nucleating agents, neutralizers, antistatic agents, dispersing agents, elastomers or molecular weight reducers, and especially the inorganic filler and elastomer which are added in large amounts to the inorganic filler-containing polyolefin resin composition. When a special storage apparatus is provided for the inorganic filler and elastomer, they may be transported from the storage apparatus to the kneading/pelletizing apparatus by a publicly known transport method such as pneumatic transport.

(Premixing)

The polyolefin resin, the inorganic filler and the various additives such as antioxidants, photostabilizers, ultraviolet absorbers, nucleating agents, neutralizers, antistatic agents, dispersing agents, elastomers or molecular weight reducers used as necessary, which are transported to the kneading/pelletizing apparatus may be directly supplied to the kneading/pelletizing apparatus, but premixing them before they are supplied to the kneading/pelletizing apparatus will improve the dispersability of the inorganic filler and various additives in the inorganic resin composition, thus contributing to stable production and enhancing the outer appearance, tensile elongation and impact resistance. However, when using a powdered inorganic filler according to the invention and employing a twin-screw pelletizer as the kneading/pelletizing apparatus, the premixing may be omitted while still allowing stable production and obtaining satisfactory outer appearance, tensile elongation and impact resistance.

The premixing apparatus is not particularly restricted so long as it can uniformly disperse the polyolefin resin, the additives and the inorganic filler, and examples thereof include a batch-type Henschel mixer, tumbler mixer, quantitative mixer, continuous powder mixer, and the like. Of these types, a continuous twin-screw powder mixer is most suitable because it provides an excellent balance between treatment speed and blending performance.

(Kneading/Pelletizing Step)

The composition premixed in the manner described above is further homogenized by a kneading/pelletizing step, to make a pelletized inorganic filler-containing polyolefin resin composition.

The apparatus used for the kneading and pelletizing may be any publicly known single-screw pelletizer, twin-screw pelletizer or tandem-type kneading/pelletizing apparatus comprising a combination of a continuous kneader and a single-screw pelletizer (hereunder referred to as tandem-type kneading/pelletizing apparatus). Applying a tandem-type kneading/pelletizing apparatus which separately accomplishes a kneading step and then a subsequent pelletizing step is preferred because it will simultaneously result in excellent dispersion of the inorganic filler and various additives in the inorganic filler-containing resin composition and excellent production speed for the inorganic filler-containing resin composition, while also giving excellent outer appearance, tensile elongation and impact resistance to the inorganic filler-containing resin composition. Also, in order to reduce yellowing due to oxidative breakdown of the inorganic filler-containing resin composition, it is highly preferred for the kneading/pelletizing step to be carried out in a sealed-manner with an inert gas such as nitrogen.

Using a single-screw pellitizer as the apparatus for kneading and pelletizing is highly economical since the energy required for production of the inorganic filler-containing resin composition during the kneading/pelletizing step is less than when other apparatuses are used.

When a single-screw pellitizer is used as the apparatus for kneading and pelletizing, the lower limit for the energy consumption during the kneading/pelletizing step, for production of 1 kg of the inorganic filler-containing resin composition, is preferably 0.1 kwh/kg or greater, and especially 0.12 kwh/kg or greater, in order to maintain uniform product quality while also maintaining a consistent level of inorganic filler dispersion, outer appearance, tensile elongation and impact resistance.

The upper limit for the energy consumption during the kneading/pelletizing step, for production of 1 kg of the inorganic filler-containing resin composition, is preferably no greater than 0.5 kwh/kg and especially no greater than 0.4 kwh/kg, in consideration of economy, tensile elongation and impact resistance. The energy consumption during the kneading/pelletizing step for production of 1 kg of the inorganic filler-containing resin composition may be calculated by the following equation (1).

[Equation 1]

$$\text{Energy consumption by pelletizer (kw)/resin composition production speed (kg/h)} \quad (1)$$

When a twin-screw pelletizer is used as the apparatus for kneading and pelletizing, the dispersion of the inorganic filler and various additives in the inorganic filler-containing resin composition is better than when using other types of apparatuses, while the outer appearance, tensile elongation and impact resistance are also superior. Thus, using a, twin-screw pelletizer allows adequate dispersion of the inorganic filler to be ensured even when the inorganic filler is supplied from a location on the path of the cylinder, thus offering the following advantages.

a) When mica or the like having a high aspect ratio is used as the inorganic filler, excessive fragmentation of the inorganic filler is prevented, thus avoiding reduction in dimensional stability.

b) The inorganic filler can be supplied to the molten polyolefin resin, thus allowing stable supply of the inorganic filler.

c) The aforementioned premixing step can be omitted.

When a twin-screw pefletizer is used as the apparatus for kneading and pelletizing, the energy consumption during the kneading/pelletizing step, for production of 1 kg of the inorganic filler-containing resin composition, is preferably 0.2 kwh/kg or greater, and especially 0.23 kwh/kg or greater, in order to maintain uniform product quality while also maintaining a consistent level of inorganic filler dispersion, outer appearance, tensile elongation and impact resistance. The upper limit is for the energy consumption during the kneading/pelletizing step, for production of 1 kg of the inorganic filler-containing resin composition, is preferably no greater than 0.6 kwh/kg and especially no greater than 0.5 kwh/kg, in consideration of economy, tensile elongation and impact resistance. The energy When a continuous kneader plus single-screw pelletizer is employed as the apparatus for kneading and pelletizing, both the dispersion of the inorganic filler and various additives in the inorganic filler-containing resin composition and the production speed of the inorganic filler-containing resin composition are excellent, while the outer appearance, tensile elongation and impact resistance of the inorganic filler-containing resin composition are also excellent.

When tandem-type kneading/pelletizing apparatus comprising a combination of a continuous kneader and a single-screw pelletizer is employed as the apparatus for kneading and pelletizing, the energy consumption during the kneading/pelletizing step, for production of 1 kg of the inorganic filler-containing resin composition, is preferably 0.16 kwh/kg or greater, and especially 0.18 kwh/kg or greater, in order to maintain uniform product quality while also maintaining a consistent level of inorganic filler dispersion, outer appearance, tensile elongation and impact resistance.

The upper limit for the energy consumption during the kneading/pelletizing step, for production of 1 kg of the inorganic filler-containing resin composition, is preferably no greater than 0.5 kwh/kg and especially no greater than 0.4 kwh/kg, in consideration of economy, tensile elongation and impact resistance. The energy consumption during the kneading/pelletizing step for production of 1 kg of the inorganic filler-containing resin composition may be calculated by the following equation (2).

[Equation 2]

$$\text{Total energy consumption by continuous kneader and pellitizer (kw)/resin composition production speed (kg/h)} \quad (2)$$

According to the invention, the kneading/pelletizing apparatus of the inorganic filler-containing resin composition may be any of the aforementioned apparatuses used alone, but from the standpoint of balance with the polyolefin resin production speed in the polymerization step and the inorganic filler-containing resin composition produced, a plurality of kneading/pelletizing apparatuses are preferably used for each polymerization apparatus. When a plurality of kneading/pelletizing apparatuses are used for each polymerization apparatus, one or more of the kneading/pelletizing apparatuses may be used as an exclusive production apparatus for the inorganic filler-containing polyolefin resin composition.

According to the invention, there is no lower limit for the production speed of the inorganic filler-containing resin composition in the case of one kneading/pelletizing apparatus, but from economic considerations a speed of 300 kg/h or greater is preferred, and a speed of 1 t/h or greater is more preferred. The upper limit is also not restricted, but in consideration of the inorganic filler dispersion, tensile elongation, impact resistance and outer appearance, it is preferably no greater than 20 t/h and more preferably not greater than 10 t/h.

Examples of polyolefin resins to be used for the invention include high-density polyethylene, linear low-density polyethylene, propylene homopolymer, polypropylene-based block copolymers such as propylene-ethylene block copolymer and propylene-ethylene/propylene block copolymer, and polypropylene-based random copolymers such as propylene/ethylene random copolymer and propylene/ethylene/butene random copolymer, as well as polymethylpentene, etc. There may also be mentioned acid-modified polyolefins obtained by graft reaction of these polymers with acids having unsaturated groups such as maleic anhydride. Among these, propylene homopolymer and polypropylene-based block copolymers are preferably used for excellent balance between economy and mechanical properties, while polypropylene-based block copolymers are even more preferred for their excellent impact resistance.

There are no particular restrictions on the production processes and production apparatuses for these polyolefin resins, and any gas phase polymerization, slurry polymerization, bulk polymerization or bulk/gas phase polymerization processes may be used. If necessary, the polyolefin resin may be purified. According to the invention, the form of the polyolefin resin produced by the polymerization apparatus is either powdered or granular, and although no particular restrictions are placed on the mean particle size, it is generally in the range of 50–4000 $\mu$m.

The melt flow rate (230° C., 21.18 N load) of the polyolefin resin used for the invention is preferably 1–100 g/10 min, more preferably 4–80 g/10 min and even more preferably 6–40 g/10 min, in consideration of stable operation, and the inorganic filler dispersion, impact resistance, tensile elongation and outer appearance.

According to the invention, the inorganic filler may be any inorganic filler commonly used for polyolefins, such as talc, calcium carbonate, mica, magnesium hydroxide, barium sulfate, wollastonite, magnesium carbonate, aluminum hydroxide, silicon dioxide, titanium dioxide, magnesium oxide, zinc oxide, calcium oxide, zinc sulfide, glass fibers, potassium titanate, carbon fibers, metal fibers or the like. Among these, talc, calcium carbonate, mica and wollastonite are preferred, and especially talc, in consideration of the rigidity reinforcing effect, impact resistance and tensile elongation.

The inorganic filler of the invention may be a powdered inorganic filler, or else a master batch may be used containing the inorganic filler in the polyolefin resin at high density. When a powdered inorganic filler is used, the inorganic filler dispersion is excellent, and the impact resistance, tensile elongation and outer appearance are also excellent. On the other hand, when a master batch containing the inorganic filler at high density in the polyolefin resin is used, there is no leakage of inorganic filler dust at the hopper of the pelletizer or continuous kneader or at the seal sections of the continuous kneader, and the workability is therefore excellent.

When a powdered inorganic filler such as talc, calcium carbonate or wollastonite is employed, using a compressed inorganic filler deaired by compression can prevent the above-mentioned leakage of inorganic filler dust, and thus improve the workability. The upper limit for the compression ratio of the compressed inorganic filler is not particularly restricted, but in consideration of the inorganic filler dispersion, tensile elongation, impact resistance and outer appearance, it is preferably no greater than 3.0 and more preferably no greater than 2.5. The lower limit is also not particularly restricted, but in consideration of the aforementioned improving effect on the workability, it is preferably at least 1.1 and more preferably at least 1.6.

The compression ratio of the compressed inorganic filler can be calculated by the following equation (3), where the bulk density may be measured by the method specified by JIS K6722.

[Equation 3]

Bulk density of compressed inorganic filler when supplied to the kneading/pelletizing apparatus÷bulk density of inorganic filler before compression (3)

As methods for degassing the inorganic filler there may be mentioned methods of compression molding of the inorganic filler at high pressure by rotation of two rollers, followed by pulverization and pelletization of the obtained molded sheet (compression roller methods), methods of degassing using vacuum pumps and combinations of these methods.

When calcium carbonate, talc or wollastonite is used as the inorganic filler, the mean particle size of the inorganic filler is not particularly restricted, but in consideration of economy and the inorganic filler dispersion, outer appearance, rigidity reinforcing effect and impact resistance, it is preferably 0.1–20 μm, more preferably 0.5–10 μm and even more preferably 1–5 μm.

When mica is used as the inorganic filler, the mean particle size of the mica is preferably 30–100 μm. considering the aspect ratio of mica, the rigidity reinforcing effect and dimensional stability.

The amount of inorganic filler to be included in the polyolefin resin is preferably 0.1–50 wt % and more preferably 1–40 wt % based on the weight of the inorganic filler-containing polyolefin resin composition, in consideration of the rigidity reinforcing effect, impact resistance and the inorganic filler dispersion and outer appearance.

According to the invention, when an elastomer is used for the purpose of improving the impact resistance, the elastomer may be any one which is commonly used for polyolefins, such as ethylene-α-olefin copolymer rubber, propylene-butene copolymer rubber, ethylene-α-olefin-diene copolymer rubber, styrene-butadiene copolymer rubber, styrene-ethylene-butylene block copolymer rubber and styrene-ethylene-propylene block copolymer rubber. As α-olefins for the aforementioned ethylene-α-olefin copolymer rubber or ethylene-α-olefin-diene copolymer rubber there are preferred propylene, 1-butene, 1-pentene, 1-hexene, 1-heptene, and 1-octene which have 3–8 carbons, among which propylene, 1-butene and 1-octene are especially preferred. As diene components for ethylene-α-olefin-diene copolymer rubber there are preferred ethylidenenorbornene, dicyclopentadiene and 1,4-hexadiene, among which ethylidenenorbornene is especially preferred. The content of the α-olefin component of the ethylene-α-olefin copolymer rubber is preferably 15–50 wt %, and especially 20–40 wt %.

The MFR (230° C., 21.18 N) of the elastomer is preferably 0.5–15 g/10 min, and especially between 0.8–12 g/10 min, in consideration of the balance between fluidity and impact resistance of the inorganic filler-containing resin composition.

In order to eliminate hindrances to production by transport of the elastomer from the storage apparatus to the kneading/pelletizing apparatus and blocking of the elastomer in the hopper, the angle of repose of the elastomer is preferably no greater than 35°, and more preferably no greater than 25°. The angle of repose of the elastomer was measured by the pouring accumulation method. Specifically, this was measured by pouring the material from a conical hopper having a bottom diameter of 15 mm, a top diameter of 35 mm and side walls inclined at an angle of 20° from the vertical, onto a cylindrical pad with a diameter of 35 mm, from a distance of 45 mm.

EXAMPLES

The present invention will now be explained in greater detail by way of the following examples and comparative examples, with the understanding that the invention is in no way limited thereto. The methods of evaluation employed for the examples and comparative examples were as follows.
<Evaluation Methods>
Basic Physical Properties
Melt flow Rate (MFR)

The method specified by JIS K6758 was carried out with a measuring temperature of 230° C. and a load of 21.18 N (units: g/10 min).
Flexural Modulus/Flexural Strength The method specified by JIS K6758 was carried out with a measuring temperature of 23° C., a span length of 60 mm and a load speed of 1.5 mm/min (units: MPa).

The procedure was carried out according to the method of JIS K6758.
Izod Impact Strength The method specified by JIS K6758 was carried out with a measuring temperature of 23° C. (units: KJ/m$^2$).
Tensile Yield Point Strength The method specified by JIS K6758 was carried out with a gauge mark spacing of 50 mm and a pull speed of 50 mm/min (units: MPa).
Tensile Elongation The method specified by JIS K6758 was carried out with a gauge mark spacing of 50 mm and a pull speed of 50 mm/min (units: %)
Outer Appearance After mixing 2 parts by weight of a carbon black-containing master batch (40 wt % carbon black content) with 100 parts by weight of each of the inorganic filler-containing polyolefin resin compositions of the examples and comparative examples, using a tumbler mixing apparatus, an injection molding machine with a clamping force of 100 t was used to fabricate a flat molded article (50 mm×50 mm×20 mm) under the following conditions.

Cylinder temperature: 230° C.

Injection speed: 30 mm/sec

Injection pressure: 1000 kg/cm$^2$

Water pass-through temperature of die: 50° C.

For the outer appearance evaluation, a count was made of the number of test pieces among 1000 flat test pieces which exhibited white spots due to agglomeration of the inorganic filler (units: number of pieces).
Production Cost A record was made of the need and number of times required for packing of the polyolefin resin, stocking of the polyolefin resin and transport from the polymerization apparatus to the compounding factory for production and sale of the inorganic filler-containing polyolefin resin composition.
Energy Consumption by Kneading/Pelletizing Step This was calculated from the total electrical energy consumption of the kneader and pellitizer and the production volume (kg/h) of the inorganic filler-containing polyolefin resin composition (units: kwh/kg).
Working Environment Production of the inorganic filler-containing resin composition and the state of inorganic filler leakage from the kneader into the surrounding environment were observed.

The materials and properties of the mixing components used in the examples and comparative examples were as follows (see Table 1).

<Mixing components>

| | | | |
|---|---|---|---|
| PO-1 | Propylene homopolymer with MFR of 6 g/10 min. | | |
| PO-2 | Ethylene-propylene block copolymer | | |
| | Polypropylene part | 88 | wt % |
| | Ethylene/propylene random copolymer part | 12 | wt % |
| | Ethylene content of ethylene/propylene random copolymer part | 48 | wt % |
| | Total MFR | 30 | g/10 min. |
| PO-3 | Ethylene-propylene block copolymer | | |
| | Polypropylene part | 87 | wt % |
| | Ethylene/propylene random copolymer part | 13 | wt % |
| | Ethylene content of ethylene/propylene random copolymer part | 65 | wt % |
| | Total MFR | 20 | g/10 min. |
| PO-4 | Ethylene-propylene block copolymer | | |
| | Polypropylene part | 87 | wt % |
| | Ethylene/propylene random copolymer part | 13 | wt % |
| | Ethylene content of ethylene/propylene random copolymer part | 60 | wt % |
| | Total MFR | 0.4 | g/10 min. |
| PO-5 | Ethylene-propylene block copolymer | | |
| | Polypropylene part | 87 | wt % |
| | Ethylene/propylene random copolymer part | 5 | wt % |
| | Ethylene content of ethylene/propylene random copolymer part | 45 | wt % |
| | Total MFR | 120 | g/10 min. |

Inorganic Filler 1
  Mean particle size: 1.7 μm
  Compression ratio: 2.0 (degassing method: compression roller)
Inorganic Filler 2
  Mean particle size: 1.7 μm
  Compression ratio: 1.0
Inorganic Filler 3
  Mean particle size: 1.7 μm
  Compression ratio: 3.2 (degassing method: compression roller)
Inorganic Filler 4
  Master batch with high talc concentration
  Talc with mean particle size of 1.7 μm : 60 wt %
  Propylene homopolymer with MFR of 6 g/10 min : 40 wt %
Inorganic Filler 5
  Calcium carbonate
  Mean particle size: 1.7 μm
  Compression ratio: 1.8 (degassing method: compression roller)
Elastomer 1
  Ethylene/1-octene copolymer rubber with MFR of 5 g/10 min and 1-octene content of 24 wt %.

Examples 1–7, 10–13

Each of the components shown in Table 1 below, i.e. the polyolefin resin synthesized in the polymerization step, the inorganic filler, and 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

The composition was melt kneaded with a continuous kneader (screw aperture: 320 mm), and continuously supplied to a single-screw pelletizer (screw aperture: 305 mm, L/D: 13) to obtain a pelletized composition. The kneading and pelletizing conditions are shown in Table 1 below.

The composition was used to fabricate test pieces using an injection molding machine with a clamping force of 100 t, under conditions with a cylinder temperature of 230° C., an injection speed of 30 mm/sec and a die water pass-through temperature of 50° C., and each test piece was set for 72 hours in a room at 50% humidity, 23° C. room temperature.

The MFR, tensile yield point strength, tensile elongation, flexural modulus and Izod impact strength were evaluated, and an evaluation of the outer appearance was also made. The evaluation results are shown in Table 1.

A production cost calculation was conducted only for Example 1, and the calculation results are shown in Table 4.

Examples 8 and 9

The same procedure was carried out as in Example 1, except that a continuous kneader (screw aperture: 320 mm) and a single-screw pelletizer (screw aperture: 380 mm, L/D: 13) were used as the kneader/pelletizer for addition of the inorganic filler. The results are shown in Table 1.

Example 13

The same procedure was carried out as in Example 1, except that the premixing with the twin-screw continuous powder mixer was omitted. The results are shown in Table 1.

TABLE 1

| | EXAMPLE | | | | | | |
|---|---|---|---|---|---|---|---|
| | 1 | 2 | 3 | 4 | 5 | 6 | 7 |
| POLYOLEFIN | | | | | | | |
| PO-1 (wt %) | 60 | | | | | 33.3 | 60 |
| PO-2 (wt %) | | 86 | | | | | |
| PO-3 (wt %) | | | 93.5 | | | | |
| PO-4 (wt %) | | | | 60 | | | |
| PO-5 (wt %) | | | | | 60 | | |
| ELASTOMER-1 | | | | | | | |
| INORGANIC FILLER | | | | | | | |
| INORGANIC FILLER-1 (wt %) | 40 | 14 | 6.5 | 40 | 40 | | |
| INORGANIC FILLER-2 (wt %) | | | | | | | |
| INORGANIC FILLER-3 (wt %) | | | | | | | |

TABLE 1-continued

| | | | | | | | |
|---|---|---|---|---|---|---|---|
| INORGANIC FILLER-4 (wt %) | | | | | | 66.7 | |
| INORGANIC FILLER-5 (wt %) | | | | | | | 40 |
| OPERATING CONDITION | | | | | | | |
| PREMIXING | YES | YES | YES | YES | YES | YES | YES |
| KNEADING/PELLETIZING APPARATUS | TANDEM | TANDEM | TANDEM | TANDEM | TANDEM | TANDEM | TANDEM |
| ROTATION NUMBER OF SCREW IN KNEADER (rpm) | 360 | 359 | 362 | 375 | 353 | 357 | 355 |
| ROTATION NUMBER OF SCREW IN PELLITIZER (rpm) | 59 | 70 | 66 | 70 | 55 | 60 | 60 |
| RESIN TEMPERATURE (° C.) | 248 | 217 | 197 | 253 | 210 | 245 | 235 |
| Q (kg/h) | 3975 | 3964 | 3804 | 3673 | 3915 | 4010 | 3861 |
| W (kw) | 768 | 729 | 736 | 808 | 689 | 765 | 712 |
| W/Q (kwh/kg) | 0.193 | 0.184 | 0.193 | 0.22 | 0.176 | 0.191 | 0.184 |
| ENVIRONMENTAL POLLUTION IN WORKING PLACE | NO | NO | NO | NO | NO | NO | NO |
| EVALUATION RESULT | | | | | | | |
| MFR (g/10 min) | 6.1 | 30 | 20 | 0.4 | 106 | 5.7 | 6.2 |
| TENSILE STRENGTH AT YIELD POINT (MPa) | 35 | 31 | 31 | 26 | 32 | 35 | 32 |
| TENSILE ELONGATION (%) | 25 | 100 | 80 | 60 | 15 | 13 | 150 |
| FLEXURAL MODULUS (MPa) | 4400 | 2500 | 2100 | 3615 | 4620 | 4350 | 3035 |
| IZOD IMPACT (KJ/m$^2$) | 4 | 8 | 6 | 9 | 4 | 3.5 | 4 |
| OUTER APPEARANCE (number) | 1 | 0 | 0 | 25 | 16 | 18 | 2 |

| | EXAMPLE | | | | | |
|---|---|---|---|---|---|---|
| | 8 | 9 | 10 | 11 | 12 | 13 |
| POLYOLEFIN | | | | | | |
| PO-1 (wt %) | | | 60 | 60 | 60 | 60 |
| PO-2 (wt %) | 86 | 86 | | | | |
| PO-3 (wt %) | | | | | | |
| PO-4 (wt %) | | | | | | |
| PO-5 (wt %) | | | | | | |
| ELASTOMER-1 | | | | | | |
| INORGANIC FILLER-1 (wt %) | 14 | 14 | | | 40 | 40 |
| INORGANIC FILLER-2 (wt %) | | | 40 | | | |
| INORGANIC FILLER-3 (wt %) | | | | 40 | | |
| INORGANIC FILLER-4 (wt %) | | | | | | |
| INORGANIC FILLER-5 (wt %) | | | | | | |
| OPERATING CONDITION | | | | | | |
| PREMIXING | YES | YES | YES | YES | YES | NO |
| KNEADING/PELLETIZING APPARATUS | TANDEM | TANDEM | TANDEM | TANDEM | TANDEM | TANDEM |
| ROTATION NUMBER OF SCREW IN KNEADER (rpm) | 385 | 410 | 360 | 360 | 370 | 360 |
| ROTATION NUMBER OF SCREW IN PELLITIZER (rpm) | 75 | 88 | 60 | 62 | 63 | 59 |
| RESIN TEMPERATURE (° C.) | 222 | 236 | 247 | 250 | 255 | 248 |
| Q (kg/h) | 6403 | 10400 | 3880 | 4050 | 4364 | 3975 |
| W (k) | 1216 | 1875 | 745 | 770 | 624 | 768 |
| W/Q (kwh/kg) | 0.19 | 0.18 | 0.192 | 0.19 | 0.143 | 0.193 |
| ENVIRONMENTAL POLLUTION IN WORKING PLACE | NO | NO | YES(*1) | NO | NO | NO |
| EVALUATION RESULT | | | | | | |
| MFR (g/10 min) | 30 | 30 | 6.2 | 5.2 | 4.8 | 5.8 |
| TENSILE STRENGTH AT YIELD POINT (MPa) | 31 | 31 | 35 | 34 | 35 | 33 |
| TENSILE ELONGATION (%) | 113 | 88 | 15 | 4 | 6 | 10 |
| FLEXURAL MODULUS (MPa) | 2430 | 2410 | 4250 | 4150 | 4210 | 4200 |
| IZOD IMPACT (KJ/m$^2$) | 9 | 7 | 4 | 2 | 3 | 3 |
| OUTER APPEARANCE (number) | 0 | 3 | 0 | 204 | 101 | 35 |

(*1)Talc was scattered from kneader and hopper so that the working place was polluted by the talc powders.

Example 14

Each of the components shown in Table 2 below, i.e. the polyolefin resin synthesized in the polymerization step, the inorganic filler, the elastomer and 0.1 part by weight of a phenolic antioxidant and 0.1 part by weight of calcium stearate with respect to 100 parts by weight of the total of the polyolefin resin, the inorganic filler and the elastomer, were premixed with a twin-screw continuous powder mixer (screw aperture: 330 mm, L/D: 9) at a screw rotation of 30 rpm, to obtain a composition.

The composition was melt kneaded with a continuous kneader (screw aperture: 320 mm), and continuously supplied to a single-screw pellitizer (screw aperture: 305 mm, L/D: 13) to obtain a pelletized composition. The kneading and pelletizing conditions are shown in Table 2 below. The evaluation was conducted in the same manner as Example 1. The results are shown in Table 2.

Examples 15–17

Each of the components shown in Table 2 below, i.e. the polyolefin resin synthesized in the polymerization step, the inorganic filler, and 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

A twin-screw pelletizer (screw aperture: 200 mm, L/D: 40) was used to pelletize the composition. The kneading and pelletizing conditions are shown in Table 2 below. The evaluation was conducted in the same manner as Example 1. The results are shown in Table 2.

Example 18

The same procedure was carried out as in Example 15, except that the premixing with the twin-screw continuous powder mixer was omitted. The results are shown in Table 2.

Examples 19–21

Each of the components shown in Table 2 below, i.e. the polyolefin resin synthesized in the polymerization step, the inorganic filler, and 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

A single-screw pelletizer (screw aperture: 200 mm, L/D: 30) was used to pelletize the composition. The kneading and pelletizing conditions are shown in Table 2 below. The evaluation was conducted in the same manner as Example 1. The results are shown in Table 2.

Example 22

The same procedure was carried out as in Example 19, except that the premixing with the twin-screw continuous powder mixer was omitted. The results are shown in Table 2.

TABLE 2

| | EXAMPLE | | | | | | | | |
|---|---|---|---|---|---|---|---|---|---|
| | 14 | 15 | 16 | 17 | 18 | 19 | 20 | 21 | 22 |
| POLYOLEFIN | | | | | | | | | |
| PO-1 (wt %) | | | | | | | | | |
| PO-2 (wt %) | 60 | 60 | 60 | 60 | 60 | 60 | 60 | 60 | 60 |
| PO-3 (wt %) | | | | | | | | | |
| PO-4 (wt %) | | | | | | | | | |
| PO-5 (wt %) | | | | | | | | | |
| ELASTOMER-1 | 15 | 15 | 15 | 15 | 15 | 15 | 15 | 15 | 15 |
| INORGANIC FILLER | | | | | | | | | |
| INORGANIC FILLER-1 (wt %) | 25 | 25 | | 25 | 25 | 25 | | 25 | 25 |
| INORGANIC FILLER-2 (wt %) | | | | | | | | | |
| INORGANIC FILLER-3 (wt %) | | | 25 | | | | 25 | | |
| INORGANIC FILLER-4 (wt %) | | | | | | | | | |
| INORGANIC FILLER-5 (wt %) | | | | | | | | | |
| OPERATING CONDITION | | | | | | | | | |
| PREMIXING | YES | YES | YES | YES | NO | YES | YES | YES | NO |
| KNEADING/PELLETIZING APPARATUS | TANDEM | TWIN-SCREW | TWIN-SCREW | TWIN-SCREW | TWIN-SCREW | SINGLE-SCREW | SINGLE-SCREW | SINGLE-SCREW | SINGLE-SCREW |
| ROTATION NUMBER OF SCREW IN KNEADER (rpm) | 375 | — | — | — | — | — | — | — | — |
| ROTATION NUMBER OF SCREW IN PELLITIZER (rpm) | 65 | 210 | 209 | 172 | 202 | 160 | 165 | 150 | 163 |
| RESIN TEMPERATURE (° C.) | 209 | 225 | 227 | 218 | 217 | 204 | 207 | 206 | 208 |
| Q (kg/h) | 3880 | 2010 | 2025 | 1999 | 2056 | 3027 | 3100 | 2987 | 3055 |
| W (kw) | 737 | 482 | 465 | 360 | 494 | 454 | 435 | 240 | 490 |
| W/Q (kwh/kg) | 0.19 | 0.24 | 0.23 | 0.18 | 0.24 | 0.15 | 0.14 | 0.08 | 0.16 |
| ENVIRONMENTAL POLLUTION IN WORKING PLACE | NO | NO | NO | NO | NO | NO | NO | NO | NO |
| EVALUATION RESULT | | | | | | | | | |
| MFR (g/10 min) | 18 | 19 | 18 | 16 | 18 | 18 | 17 | 17 | 17 |
| TENSILE STRENGTH AT YIELD POINT (MPa) | 24 | 25 | 24 | 24 | 25 | 23 | 22 | 22 | 23 |
| TENSILE ELONGATION (%) | 400 | 550 | 200 | 80 | 280 | 300 | 180 | 70 | 190 |
| FLEXURAL MODULUS (MPa) | 2310 | 2300 | 2250 | 2100 | 2240 | 2250 | 2200 | 2250 | 2300 |
| IZOD IMPACT (KJ/m$^2$) | 48 | 55 | 35 | 29 | 43 | 40 | 28 | 20 | 31 |
| OUTER APPEARANCE (number) | 0 | 0 | 18 | 44 | 17 | 3 | 57 | 63 | 79 |

Example 23

A polyolefin resin (PO-2 listed above) was produced in an olefin polymerization apparatus at a polymerization speed of 8000 kg/h. The obtained polyolefin resin was kneaded and pelletized simultaneously and in parallel with the three kneading/pelletizing apparatuses A to C described below, to obtain inorganic filler-containing polyolefin resin compositions. The evaluation was conducted in the same manner as Example 1. The results are shown in Table 3.

A) Tandem-Type Kneading/Pelletizing Apparatus

Each of the polyolefin resins and inorganic fillers shown in Table 3 below, with 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

The composition was melt kneaded with a continuous kneader (screw aperture: 320 mm), and continuously supplied to a single-screw pelletizer (screw aperture: 380 mm, L/D: 13) to obtain a pelletized composition. The kneading and pelletizing conditions are shown in Table 3 below. The evaluation was conducted in the same manner as Example 1. The results are shown in Table 3.

B) Twin-screw pellitizer

Each of the polyolefin resins and inorganic fillers shown in Table 3 below, with 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

A twin-screw pelletizer (screw aperture: 200 mm, L/D: 40) was used to pelletize the composition. The kneading and pelletizing conditions are shown in Table 3 below.

C) Single-screw Pelletizer

Each of the polyolefin resins and inorganic fillers shown in Table 3 below, with 0.1 part by weight of a phenolic antioxidant and 0.1 part by weight of calcium stearate with respect to 100 parts by weight of the total of the polyolefin resin and the inorganic filler, were premixed with a twin-screw continuous powder mixer (screw aperture: 330 mm, L/D: 9) at a screw rotation of 30 rpm, to obtain a composition.

A single-screw pelletizer (screw aperture: 200 mm, L/D: 30) was used to pelletize the composition. The kneading and pelletizing conditions are shown in Table 3 below.

TABLE 3

|  | EXAMPLE 23 | | |
| --- | --- | --- | --- |
| POLYOLEFIN | | | |
| PO-1 (wt %) | | | |
| PO-2 (wt %) | 60 | 70 | 90 |
| PO-3 (wt %) | | | |
| PO-4 (wt %) | | | |
| PO-5 (wt %) | | | |
| ELASTOMER-1 | 15 | 20 | |
| INORGANIC FILLER | | | |
| INORGANIC FILLER-1 (wt %) | 25 | 10 | 10 |
| INORGANIC FILLER-2 (wt %) | | | |
| INORGANIC FILLER-3 (wt %) | | | |
| INORGANIC FILLER-4 (wt %) | | | |
| INORGANIC FILLER-5 (wt %) | | | |
| OPERATING CONDITION | | | |
| PREMIXING | YES | YES | YES |
| KNEADING/PELLETIZING APPARATUS | TANDEM | TWIN-SCREW | SINGLE-SCREW |
| ROTATION NUMBER OF SCREW IN KNEADER (rpm) | 385 | — | — |
| ROTATION NUMBER OF SCREW IN PELLITIZER (rpm) | 76 | 210 | 160 |
| RESIN TEMPERATURE (° C.) | 222 | 225 | 204 |
| Q (kg/h) | 6449 | 2002 | 3033 |
| W (kw) | 1224 | 481 | 455 |
| W/Q (kwh/kg) | 0.19 | 0.24 | 0.15 |
| ENVIRONMENTAL POLLUTION IN WORKING PLACE | NO | NO | NO |
| EVALUATION RESULT | | | |
| MFR (g/10 min) | 18 | 16 | 28 |
| TENSILE STRENGTH AT YIELD POINT (MPa) | 24 | 22 | 30 |
| TENSILE ELONGATION (%) | 350 | 700 | 150 |
| FLEXURAL MODULUS (MPa) | 2310 | 1430 | 2060 |
| IZOD IMPACT (KJ/m$^2$) | 45 | 64 | 7 |
| OUTER APPEARANCE (number) | 0 | 0 | 0 |

Comparative Example 1

Each of the components shown in Table 4 below, specifically the polyolefin resin synthesized in the polymerization step, with 0.05 part by weight of a phenolic antioxidant and 0.05 part by weight of calcium stearate with respect to 100 parts by weight of the polyolefin resin, were premixed with a twin-screw continuous powder mixer (screw aperture: 330 mm, L/D: 9) at a screw rotation of 25 rpm. The composition was then melt kneaded with a continuous kneader (screw aperture: 320 mm), and a single-screw pelletizer (screw aperture: 305 mm, L/D: 13) was used to obtain a pelletized composition.

The pelletized polyolefin resin was packed into paper bags at 25 kg each and then transported to a storage warehouse.

The packed pelletized polyolefin resin was then transported to a compounding factory in a different location than the olefin polymerization apparatus.

At the compounding factory, the pelletized polyolefin resins and inorganic fillers listed in Table 4, with 0.07 part by weight of a phenolic antioxidant and 0.07 part by weight of calcium stearate with respect to 100 parts by weight of the total of the pelletized polyolefin resin and inorganic filler, were premixed with a high-speed agitation mixing apparatus (Henschel mixer (trade name)) for 3 minutes at room temperature to obtain a composition.

The composition was kneaded and pelletized with a single-screw pelletizer (screw aperture: 100 mm, L/D: 32) to obtain a pelletized composition. The evaluation was conducted in the same manner as Example 1. The results are shown in Table 4.

TABLE 4

| | EXAMPLE 1 | COMPARATIVE EXAMPLE 1 |
|---|---|---|
| POLYOLEFIN | | |
| PO-1 (wt %) | 60 | 60 |
| PO-2 (wt %) | | |
| PO-3 (wt %) | | |
| PO-4 (wt %) | | |
| PO-5 (wt %) | | |
| ELASTOMER-1 | | |
| INORGANIC FILLER | | |
| INORGANIC FILLER-1 (wt %) | 40 | 40 |
| INORGANIC FILLER-2 (wt %) | | |
| INORGANIC FILLER-3 (wt %) | | |
| INORGANIC FILLER-4 (wt %) | | |
| INORGANIC FILLER-5 (wt %) | | |
| OPERATING CONDITION | | |
| KNEADING/PELLETIZING APPARATUS | TANDEM | SINGLE-SCREW |
| ENVIRONMENTAL POLLUTION IN WORKING PLACE | NO | YES(*2) |
| EVALUATION RESULT | | |
| MFR (g/10 min) | 6.1 | 6.2 |
| TENSILE STRENGTH AT YIELD POINT (MPa) | 35 | 36 |
| TENSILE ELONGATION (%) | 25 | 21 |
| FLEXURAL MODULUS (MPa) | 4400 | 4350 |
| IZOD IMPACT, (KJ/m²) | 4 | 4 |
| OUTER APPEARANCE (number) | 1 | 1 |
| PRODUCTION COST | | |
| PACKING INTO BAG | NECESSARY (ONCE) | NECESSARY (TWICE) |
| STOCKING OF POLYOLEFIN RESIN | UNNECESSARY | NECESSARY |
| STOCKING OF INORGANIC FILLER-CONTAINING POLYOLEFIN RESIN | NECESSARY | NECESSARY |
| TRANSPORTATION FROM POLYMERIZATION APPARATUS TO COMPOUNDING PLANT ON LAND | UNNECESSARY | NECESSARY |

(*2)Talc powders were scattered from hopper.

As clearly seen in Table 4, no differences in performance were found between Example 1 within the scope of the invention and Comparative Example 1, as regarded the tensile elongation, flexural modulus, Izod impact strength, effect on the working environment and outer appearance. As also clearly seen in Table 4, Example 1 which was within the scope of the invention had a cheaper production cost than Comparative Example 1.

Effect of the Invention

As explained above, by carrying out according to the present invention a continuous series of steps from an olefin polymerization step up to a kneading/pelletizing step in which the polyolefin resin obtained by the polymerization step is kneaded and pelletized with an inorganic filler and various additives, it is possible to maintain stable product quality while producing a highly economical inorganic filler-containing polyolefin resin composition which simplifies the intermediate storage facilities such as warehouses and the conveyance equipment, and reduces stocking costs and transport costs.

In other words, because of the excellent properties of the inorganic filler-containing polyolefin resin composition obtained by the process for production of an inorganic filler-containing polyolefin resin composition according to the invention, it is suitable for use as a material for various automobile parts, household electric appliances and daily commodities.

What is claimed is:

1. A process for production of an inorganic filler-containing polyolefin resin composition, in which the process carries out a continuous series of steps train an olefin polymerizatzon step up to a kneadinglpelletizing step where the polyolefin resin obtained by the polymerization step is kneaded and pelletized with an inorganic filler and one or more additives, the process being carried out in a continuous series of steps such that the steps are carried out an a connected process line and the polyolefin resin does not exit the process line before having been pelletized to produce the inorganic filler-containing polyolefin resin composition and that the polyolefin resin, the inorganic filler and the one or more additives are premixed between the polymerization step and the kneading/pelletizing step.

2. A process for production of an inorganic filler-containing polyolefin resin composition according to claim 1, in which the inorganic filler is a powder compressed by degassing, wherein the compression ratio, which is the value of the bulk density of the compressed inorganic filler when supplied to the kneading/pelletizing apparatus divided by the bulk density of the inorganic filler before compression, is 1.1–3.0, wherein the bulk density is measured according to JIS K6722.

3. A process for production of an inorganic filler-containing polyolefin resin composition according to claim 2, wherein the inorganic filler is calcium carbonate, talc or wollastonite.

4. A process for production of an inorganic filler-containing polyolefin resin composition, in which the process carries out a continuous series of steps from an olefin polymerization step up to a kneading/pelletizing step where the polyolefin resin obtained by the polymerization step is kneaded and pelletized with an inorganic filler and one or more additives, the process being carried out in a continuous series of steps such that the steps are carried out in a connected process line and the polyolefin resin does not exit the process line before having been pelletized to produce the inorganic filler-containing polyolefin resin composition and that the kneading/pelletizing step is carried out using a tandem kneading/pelletizing apparatus which separately accomplishes the kneading step and the pelletizing step.

* * * * *